(12) United States Patent
Schuffenhauer et al.

(10) Patent No.: US 8,764,354 B2
(45) Date of Patent: Jul. 1, 2014

(54) CUTTING TOOL FOR A MACHINE TOOL

(75) Inventors: Michael Schuffenhauer, Furth (DE); Bernhard Eckl, Rottendorf (DE); Xaver Spichtinger, Oberviechtach (DE); Armin Zimmermann, Oberviechtach (DE)

(73) Assignee: Kennametal Inc., Latrobe, PA (US)

( * ) Notice: Subject to any disclaimer, the term of this patent is extended or adjusted under 35 U.S.C. 154(b) by 303 days.

(21) Appl. No.: 13/255,779

(22) PCT Filed: Mar. 10, 2010

(86) PCT No.: PCT/EP2010/001478
§ 371 (c)(1),
(2), (4) Date: Sep. 9, 2011

(87) PCT Pub. No.: WO2010/102793
PCT Pub. Date: Sep. 16, 2010

(65) Prior Publication Data
US 2012/0121344 A1    May 17, 2012

(30) Foreign Application Priority Data
Mar. 10, 2009    (DE) .......................... 10 2009 012 433

(51) Int. Cl.
*B23C 5/28*    (2006.01)

(52) U.S. Cl.
USPC ............................ 408/57; 408/59; 408/231

(58) Field of Classification Search
CPC ........................................................ B23C 5/28
USPC ......... 407/11; 408/57, 59, 231, 233; 409/234, 409/136, 135; 279/8, 20
See application file for complete search history.

(56) References Cited

U.S. PATENT DOCUMENTS 1,439,567 A * 12/1922 Maupin ........................... 408/56
3,555,935 A *  1/1971 Dorrenberg .................. 76/108.6
(Continued)

FOREIGN PATENT DOCUMENTS

CN    1190917 A        8/1998
DE    4416380 A1 * 11/1995    ................ B23C 5/20
(Continued)

OTHER PUBLICATIONS

European Patent Office, "International Search Report", German Language and English Language versions, Jun. 15, 2010, 4 pp. total.

*Primary Examiner* — Andrea Wellington
*Assistant Examiner* — Ryan Rufo
(74) *Attorney, Agent, or Firm* — Larry R. Meenan, Esq.

(57) ABSTRACT

The invention relates to a cutting tool for a machine tool, comprising a cutting head (1), a shaft (2), and a coupling which removably fixes the cutting head (1) to the shaft (2), said coupling comprising a coupling pin (6) on the back of the cutting head (7) and a receptacle (5) in the shaft (2), which receptacle is complementary to the coupling pin (6) and accommodates the coupling pin (6) when the coupling is closed, comprising a central coolant channel (20) in the shaft (2), which separates into two sub-channels (12) in the region of the receptacle (5), the two sub-channels (12) flanking the receptacle (5) in the wall thereof and opening into the flat contact surface (10) annularly surrounding the opening edge (8) of the receptacle (5), and comprising a flat collar (16) on the back of the cutting head (7) having an annular distribution groove (15). The tool also comprises at least one coolant hole (19) connecting the cutting edges (14) on the cutting head (1) to the distribution groove (15).

8 Claims, 10 Drawing Sheets

(56) References Cited

U.S. PATENT DOCUMENTS

| | | | |
|---|---|---|---|
| 4,040,765 A * | 8/1977 | Vig | 408/239 A |
| 4,557,642 A * | 12/1985 | Dudas et al. | 408/239 R |
| 4,799,838 A * | 1/1989 | Kubo et al. | 409/234 |
| 6,012,881 A * | 1/2000 | Scheer | 408/227 |
| 6,485,235 B1 * | 11/2002 | Mast et al. | 408/1 R |
| 6,905,278 B2 * | 6/2005 | Kress et al. | 403/296 |
| 7,322,779 B2 | 1/2008 | Kress et al. | |
| 8,172,490 B2 | 5/2012 | Kretzschmann et al. | |
| 2002/0067965 A1 * | 6/2002 | Kress et al. | 408/59 |
| 2003/0002936 A1 * | 1/2003 | Camozzi | 408/59 |
| 2009/0123240 A1 | 5/2009 | Borschert et al. | |
| 2009/0283975 A1 | 11/2009 | Kretzschmann et al. | |

FOREIGN PATENT DOCUMENTS

| | | |
|---|---|---|
| DE | 103 26 928 A1 | 1/2005 |
| DE | 10 2005 031 683 A1 | 1/2007 |
| DE | 10 2005 051 545 A1 | 5/2007 |
| DE | 10 2006 028 373 A1 | 12/2007 |
| EP | 1 240 963 A1 | 9/2002 |
| EP | 2406029 B1 | 11/2012 |
| JP | 2006095634 | 4/2006 |
| JP | 2008018486 | 1/2008 |
| WO | 0053362 | 9/2000 |
| WO | 2007003248 A1 | 1/2007 |

* cited by examiner

CUTTING TOOL FOR A MACHINE TOOL

BACKGROUND OF THE INVENTION

The invention relates to a cutting tool of modular construction for a machine tool. This tool consists of a cutting head, a shank and a coupling effective between shank and cutting head. By means of the shank, the tool is clamped in place in the tool receptacle, for example the chuck of a machine tool. The cutting head is detachably fixed to the shank by means of the coupling. Depending on the desired field of use, the cutting head can be configured as a boring head, milling head or reaming head. However, the cutting head may also be a cutting head for any other desired cutting process.

A cutting tool having a complicated coolant guide is known from DE 103 26 928 A belonging to the prior art. Here, a plurality of coolant passages are distributed over the periphery of the shank. The number of coolant passages corresponds to the number of blades on the cutting head. Via coolant bores in the cutting head, the respective coolant passages are conductively connected to their respectively associated blades. A disadvantage in this case is the reduction in the flexural strength of the shank which is associated with the large number of cooling passages. A further disadvantage is the fact that each shank embodiment can only be used jointly with a specific cutting head embodiment.

A cutting tool having a coolant guide consisting of a central coolant passage or coolant tube and a plurality of coolant passages is known from DE 10 20-05 03 1 683 A. The coolant passages are in this case configured as fitting bores or axial grooves in the end region of the shank or of a functional insert inserted at the end into the shank. A disadvantage in this case is the large number of cooling passages and the reduction in the flexural strength of the shank in the shank end region which is again associated with said large number of cooling passages.

In the tool known from DE 103 26 928 A, a clamping cone is used as coupling between cutting head and shank. Here, the effective surfaces are very small on account of the conical shape of the clamping cone. As a result of these small effective surfaces, only very low torques can be transmitted from the shank to the cutting head and vice versa. In addition, it is felt to be a disadvantage that the clamping surfaces, that is to say the conical surfaces of the clamping cone on the cutting head and the corresponding mating surfaces, are arranged very deeply in the shank. The surfaces cannot be seen from outside when inserting the cutting head. It is therefore possible for the surfaces to tilt when inserting the cutting head into the shank. This risk of tilting can be reduced by attaching indicators to the tool. However, attaching said indicators is very complicated.

A further configuration for the coupling between cutting head and shank is known from U.S. Pat. No. 6,905,278. The coupling in this case is configured as a screwing insert having a differential thread. For this purpose, the screwing insert has two threads with different pitches. One of the threads is configured as a left-hand thread and the other as a right-hand thread. First of all, the fine thread is screwed into the respective threaded part. In a further operation, the standard or coarse thread is screwed into the other threaded part, as a result of which both coupling members, that is to say cutting head and shank, are effectively restrained against one another.

OBJECT OF THE INVENTION

The object of the invention—proceeding from the prior art—is to simplify the design of the cutting tool.

ACHIEVEMENT OF THE OBJECT

Serving to achieve this object is a cutting tool having a coolant supply disclosed are preferred configurations of this cutting tool. The cutting tools have inventive couplings of different design.

The cutting head has a coupling pin on the cutting-head rear wall thereof. This coupling pin rests in a receptacle in the shank when the coupling is closed. First of all, a central coolant passage is provided in the shank. This central passage branches into two sub-passages in the region of the receptacle. These sub-passages are directed right up to the end flat contact surface of the shank and open out there from the shank. In this way, the two sub-passages flank the receptacle. On account of the fact that only two sub-passages are incorporated in the shank, the stability thereof in the region of the receptacle is not appreciably weakened. The coupling, which is arranged in the receptacle in the shank, is kept completely free of coolant and lubricant, and therefore corrosion, contamination and the like cannot occur here.

To distribute the coolant and to feed the coolant to the blades on the cutting head, an annular distribution groove is first of all formed in a flat collar on the cutting-head rear wall. This distribution groove can be made in the flat collar by machining and can thus be made in a simple and cost-effective manner from a production point of view. The distribution groove in turn has one or more coolant bores. Via small coolant passages connected to them, these coolant bores supply the blades with coolant.

The number of coolant bores corresponds to the number of blades connected to them. In other words, a separate coolant bore having a coolant passage which is connected thereto and extends to the blade is assigned to each blade. In this way, it is possible in a simple manner to supply each blade with coolant.

Since the distribution groove distributes the coolant to any desired number of blades from only two sub-passages, a wide variety of cutting heads having a diverse number of blades can be coupled to one and the same shank. It is therefore possible with the invention to couple various cutting heads having a completely different number of blades and coolant bores, irrespective of the number of coolant feed passages in the shank.

It is also possible for the coolant passages assigned to the coolant bores in the distribution groove to open out on the cutting-head end face. This embodiment serves for machining, for example for reaming, blind bores. Here, the coolant is sprayed, as it were, onto the bottom of the bore and is reflected from there onto the blades. The blades are thus indirectly supplied with coolant in this way. The coolant supply according to the invention is therefore suitable not only for tools which push the chips in front of them but also for tools which direct the chip material from the bore via grooves at the periphery.

Finally, provision is made for the distribution groove to be widened in a funnel-like manner in certain regions in order to direct the coolant flowing out of the sub-passages of the shank more quickly into the distribution groove.

Crescent-shaped recesses are provided at the opening edge of the receptacle in order firstly to help the coolant flow into the distribution groove and secondly to ensure that, even after the rework of both the shank-side flat contact surface and the cutting-head-side flat collar, the flat contact surface rests flush on the flat collar. In other words, regions of the flat collar which cannot be reworked are not to prevent the flat contact surface from resting on the flat collar in a planar manner.

The cutting head has a coupling pin on the cutting-head rear wall thereof. When the coupling is closed, this coupling pin rests in a receptacle in the shank. In the region of the opening edge of the receptacle, a bearing surface extending from the opening edge into the receptacle is formed as part of a positive-locking coupling. Accordingly, a mating bearing surface is formed on the outer casing of the coupling pin. When the coupling is closed, the bearing surface and the mating bearing surface bear against one another and thus form a positive-locking fit. Since the bearing surface is arranged in the region of the opening edge of the receptacle in the shank, it can be easily seen from outside, which helps to displace the bearing surface and mating bearing surface when inserting the coupling pin into the receptacle and thus promotes simple and purposeful fitting of the cutting head on the shank.

Comparatively high torques can be transmitted by means of the bearing surface and mating bearing surface configured as flat faces. The torque transmission is improved by the uniform force application by means of the paired design and the arrangement of the bearing surfaces and the mating bearing surfaces opposite one another.

By means of the casing ring, said casing ring enlarging the diameter of the coupling pin, the mating bearing surfaces can be machined on the coupling pin in a simple manner.

With the cutting tool according to the invention, it is possible on the one hand to reliably couple the cutting head to the shank, because the bearing surfaces and mating bearing surfaces are arranged such that they can be easily seen. On the other hand, it is possible for the inventive coupling to transmit especially high torques between cutting head and shank.

A screwing insert having two external threads with the same direction of hand and different pitches serves as coupling. This is a screwing insert with a "differential thread".

A fine thread is alternatively or additionally used between cutting head and screwing insert, whereas a standard thread or coarse thread can be used between shank and screwing insert. The use of threads running in the same direction has the advantage that, during the clamping of the tool, that is to say during the clamping of the cutting head in the shank, both thread pitches are, as it were, subtracted from one another, because the fine thread is partly screwed out again when the coarse thread is screwed in. In contrast to the use of threads running in opposite directions, a very much lower torque is thus required for clamping the cutting head relative to the shank.

In addition, the use of right-hand threads has the advantage that a conventional cutting head which has the conventional right-hand thread on the shank rear wall thereof can also be clamped in the shank.

Therefore, the shanks can then be used not only for the clamping of the cutting head by means of a screwing insert having a differential thread but also for the clamping of cutting heads having customary right-hand threads.

DESCRIPTION OF THE FIGURES

An exemplary embodiment of the invention is explained in more detail below with reference to the figures. In the drawings, in each case in schematic and simplified, partly cutaway, illustrations.

DESCRIPTION OF THE EXEMPLARY EMBODIMENT

Figure 1:
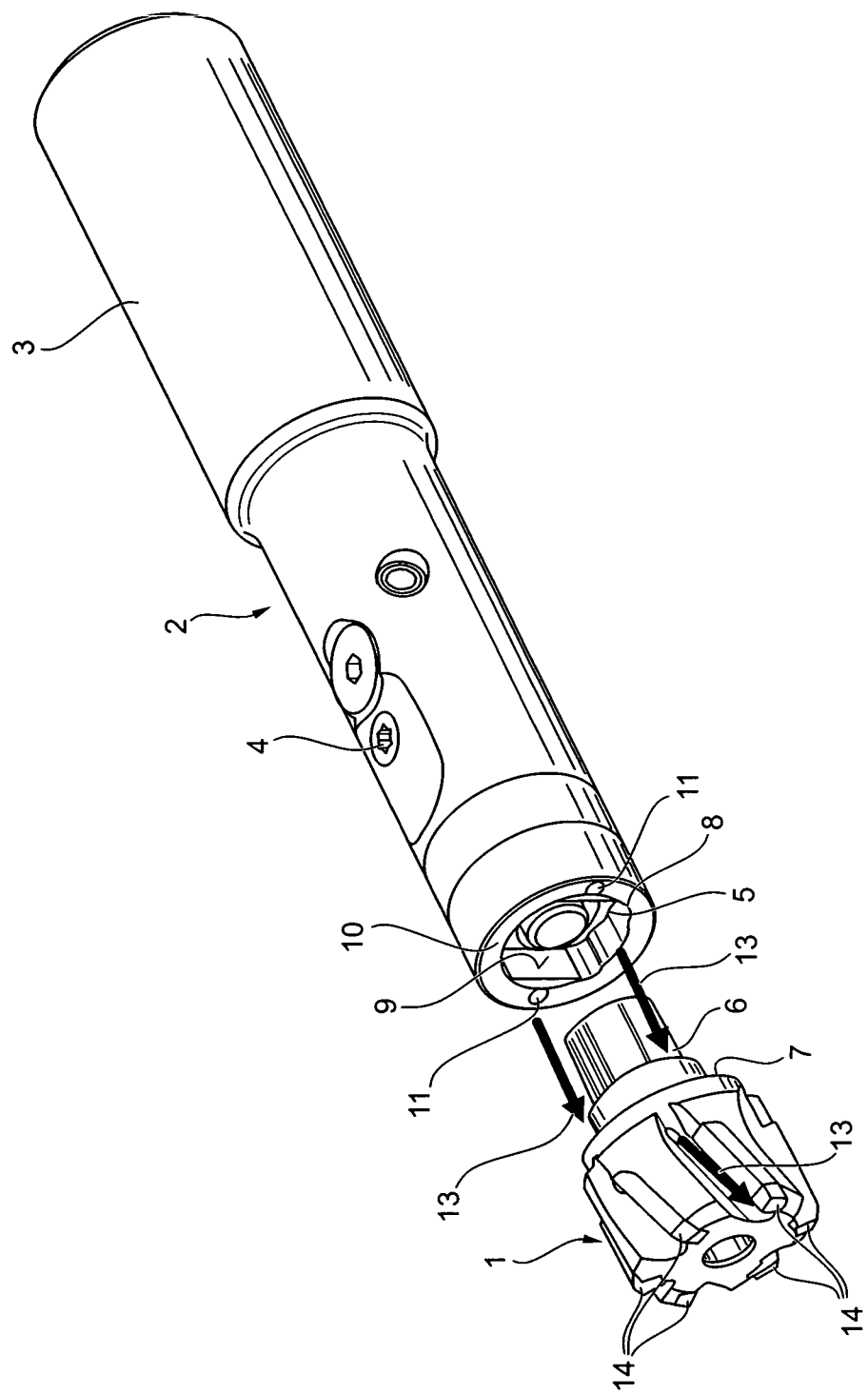
FIG. 1 shows an exploded illustration of the cutting head and the shank.
Figure 2:
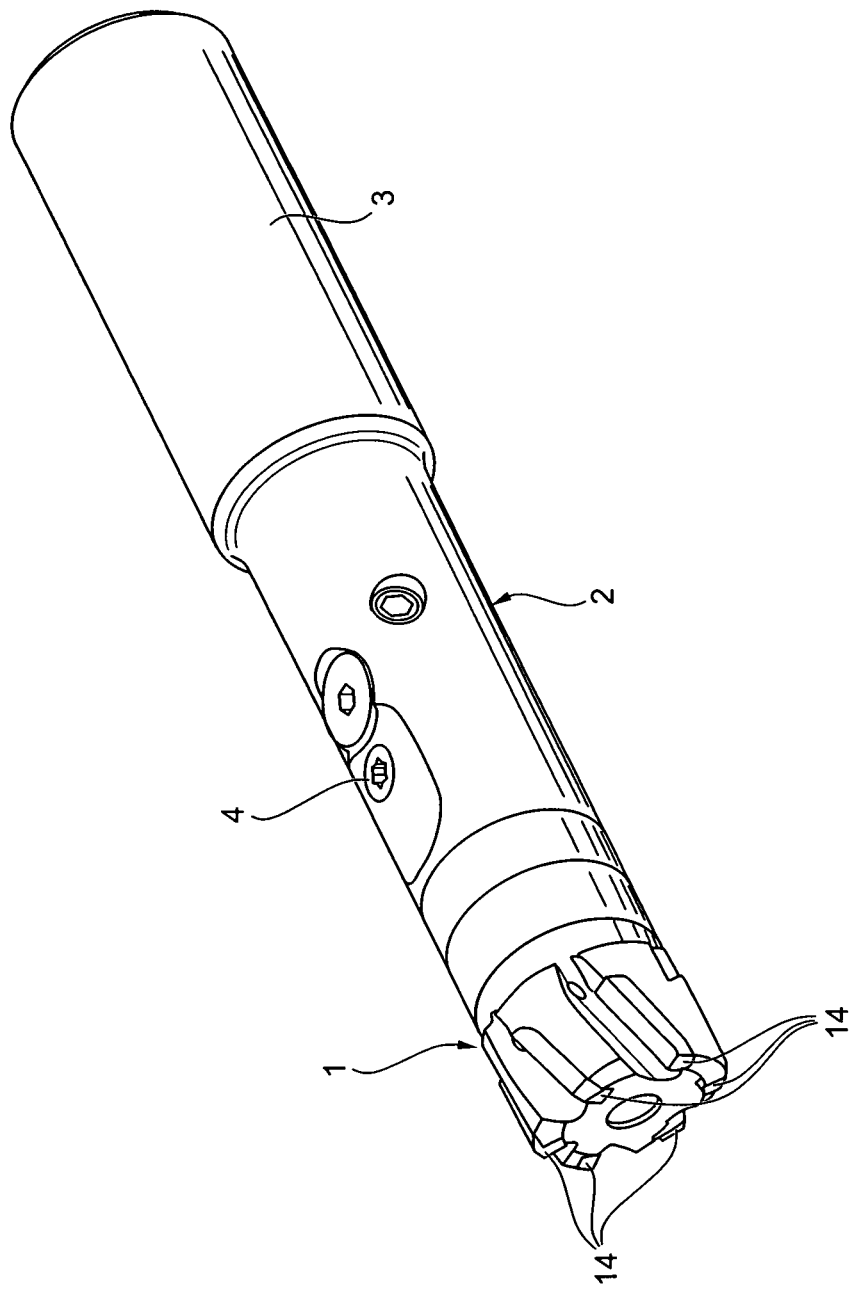
FIG. 2 shows the cutting head according to FIG. 1 fitted on the shank.

The cutting tool according to the invention is composed of a cutting head 1 and of a shank 2 coupled to the cutting head 1. The shank 2 has a tool-clamping surface 3. With the tool-clamping surface 3, the shank 2 is clamped in a tool chuck (not shown in the figures) of a machine tool. Furthermore, the shank 2 has a clamping screw 4 for closing the coupling. The shank 2 has an approximately hollow-cylindrical receptacle 5 for the coupling pin 6 of the cutting head 1. The coupling pin 6 projects from the cutting-head rear wall 7 of the cutting head 1.

In FIG. 1, one flat face 9 can be seen at the opening edge 8 of the receptacle 5. The flat faces 9 are formed opposite one another as a pair on the shank 2. This can be seen in FIG. 3. The opening edge 8 of the receptacle 5 is surrounded by the ring-like flat contact surface 10. The flat contact surface 10 is pierced by each of the orifices 11 of the sub-passages 12, said orifices 11 being opposite one another. The coolant flows from the orifices 11 in the coolant flow direction 13 indicated by the thick arrows toward the individual blades 14 on the cutting head 1.

Figure 8:
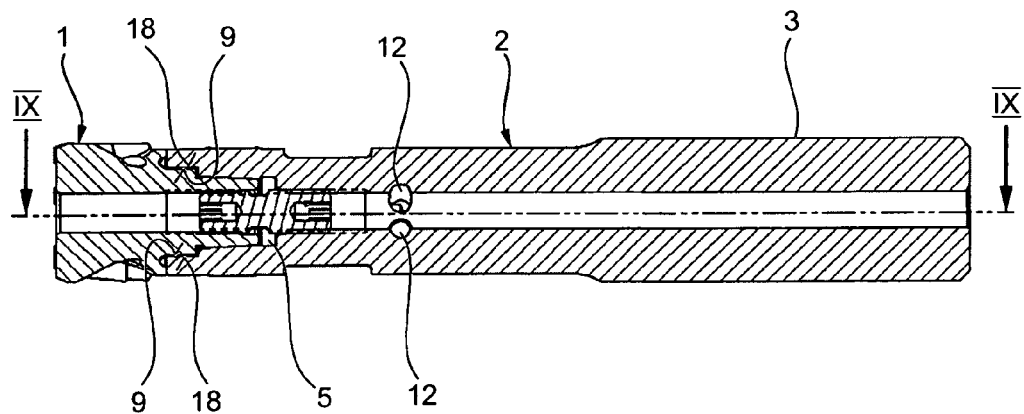
FIG. 8 shows the section VIII-VIII in FIG. 6.

To distribute the coolant, the coolant flows in the coolant flow direction 13 from the orifices 11 into the distribution groove 15 formed in the cutting-head rear wall 7. The distribution groove 15 is simply recessed in a flat collar 16 formed on the cutting-head rear wall 7. The flat collar 16 surrounds the coupling pin 6 projecting centrally from the cutting-head rear wall 7. That region of the coupling pin 6 which is adjacent to the flat collar 16 is configured as a casing ring 17 enlarging the diameter of the coupling pin 6. Two flat faces 18 located opposite one another are formed in the casing ring 17. The flat faces 18 of the cutting head 1 thus form the mating bearing surfaces for the bearing surfaces in the shank 2, which are likewise formed as flat faces 9. This can be seen in FIG. 8. The arrangement of both the flat faces 9 on the shank 2 and the flat faces 18 on the cutting head 1 opposite one another in pairs can also be seen in FIG. 8.

Figure 4:
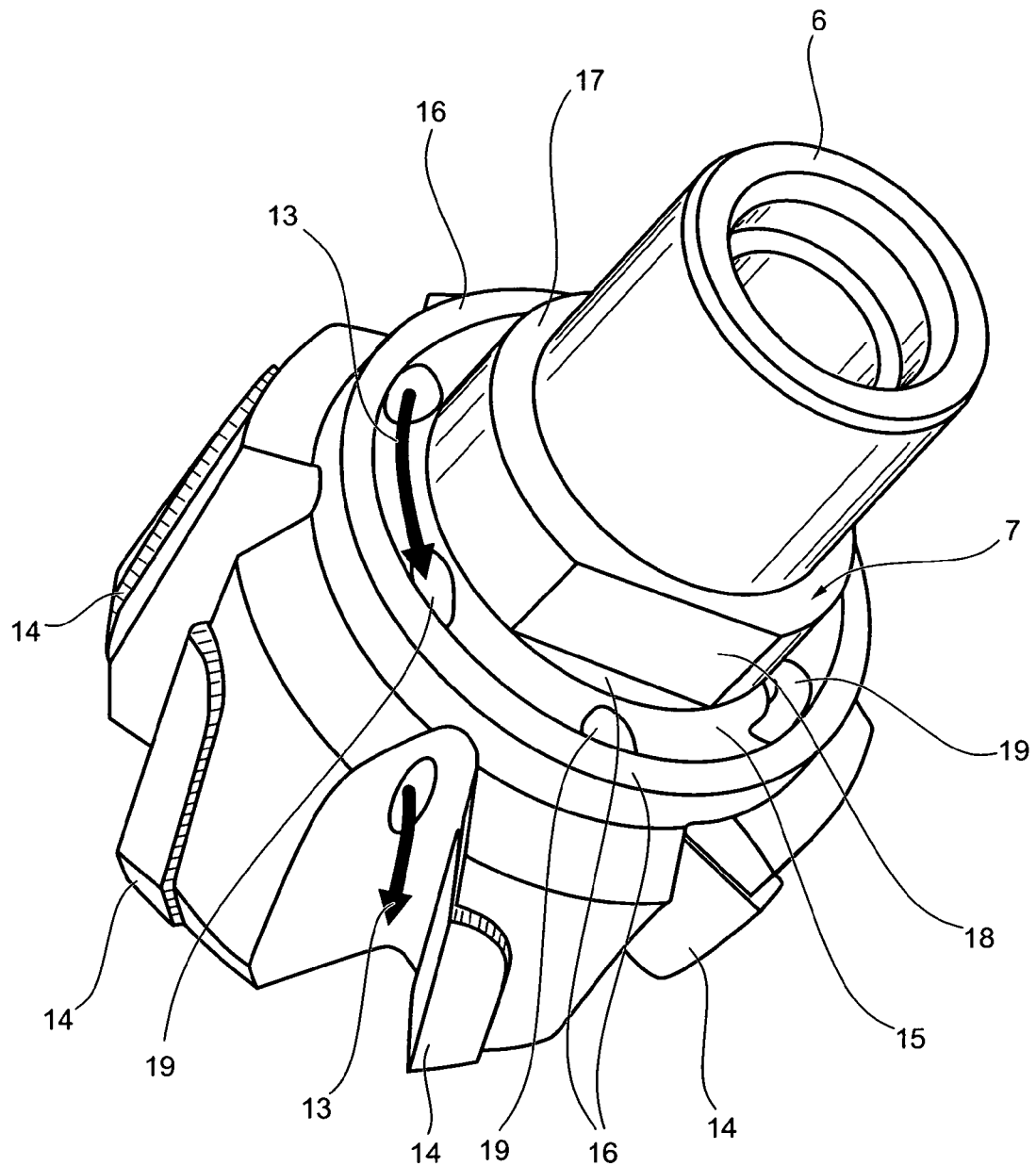
FIG. 4 shows a plan view of the cutting-head rear wall with indicated coolant course.
Figure 5:
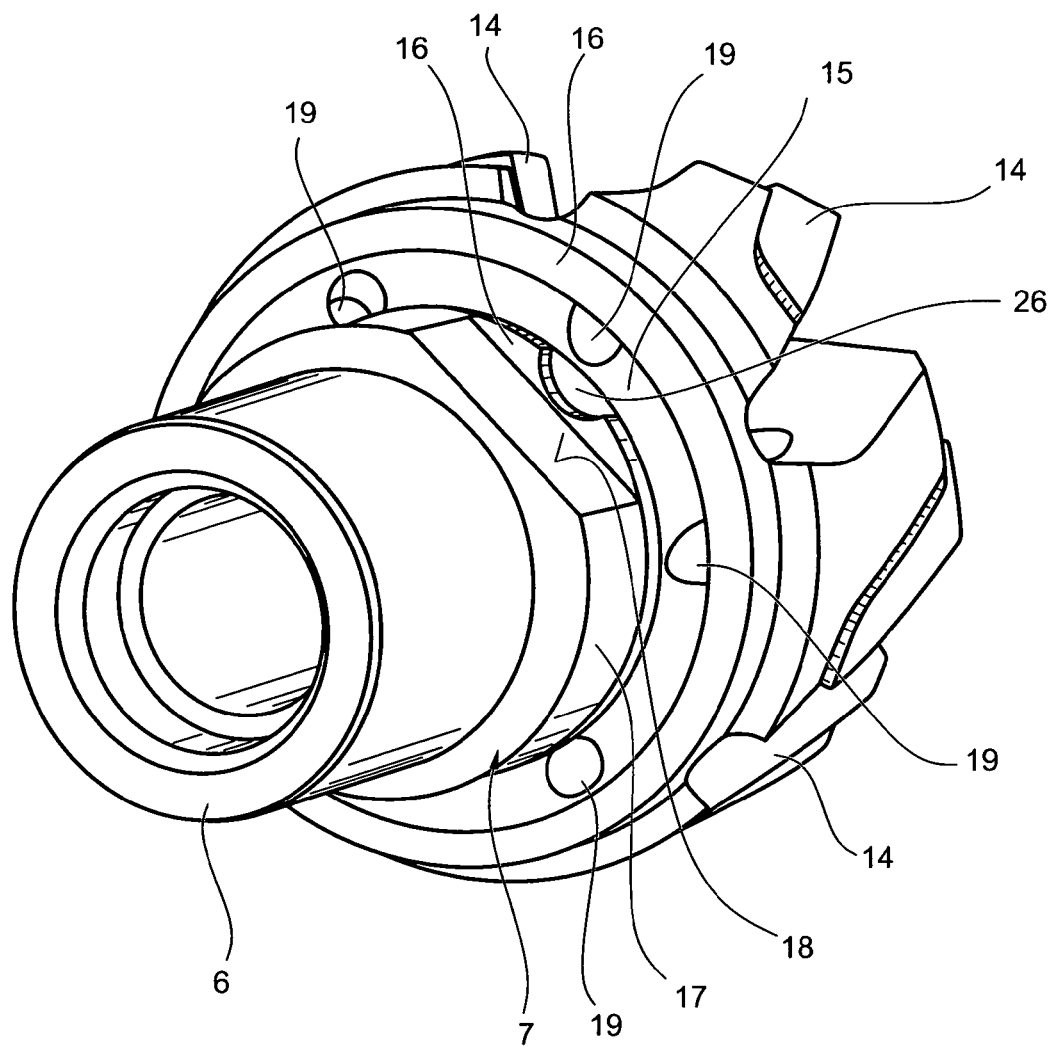
FIG. 5 shows a further plan view of the cutting-head rear wall.
Figure 6:
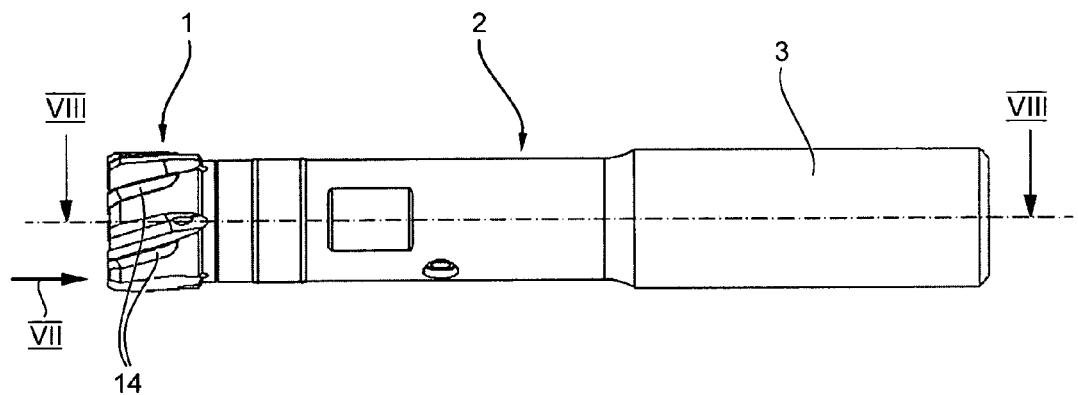
FIG. 6 shows a side view of the finally assembled cutting tool.

Coolant bores 19 are made in the distribution groove 15. In the exemplary embodiment shown in FIG. 4 and FIG. 5, the number of coolant bores 19 corresponds to the number of blades 14. A coolant bore 19 is therefore assigned to each blade 14. Coolant flows through the coolant bore 19 in the coolant flow direction 13. The coolant bores 19 are connected to the blades 14 by small coolant passages and thus deliver the coolant to the blades 14. Coolant discharges from the shank from the two orifices 11, located opposite one another, in the coolant flow direction 13 and runs into the distribution groove 15 and leaves the distribution groove 15 again in the coolant flow direction 13 through the coolant bores 19 toward the blades 14.

Figure 9:
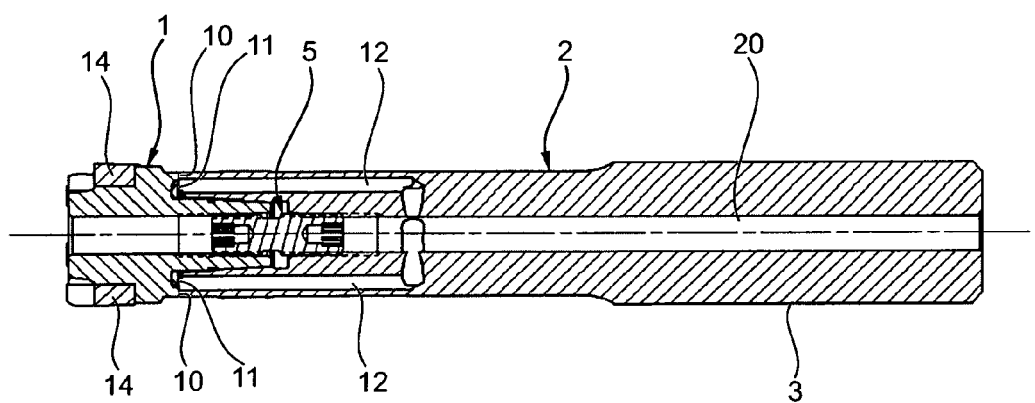
FIG. 9 shows the section IX-IX in FIG. 8.
Figure 10:
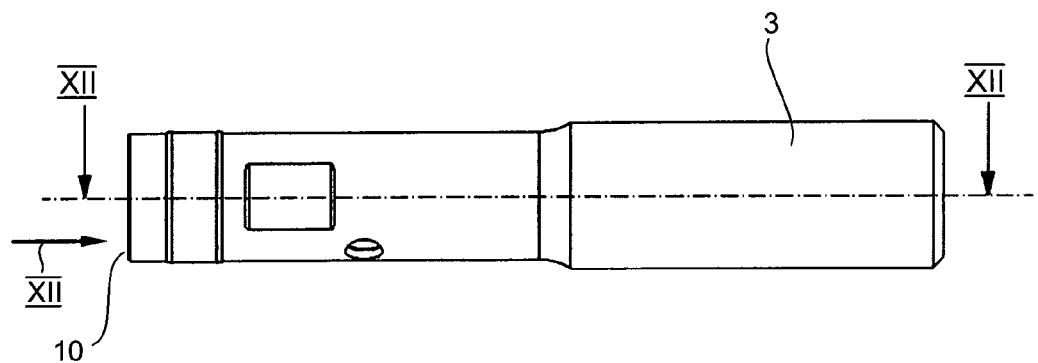
FIG. 10 shows a side view of the shank.
Figure 11:
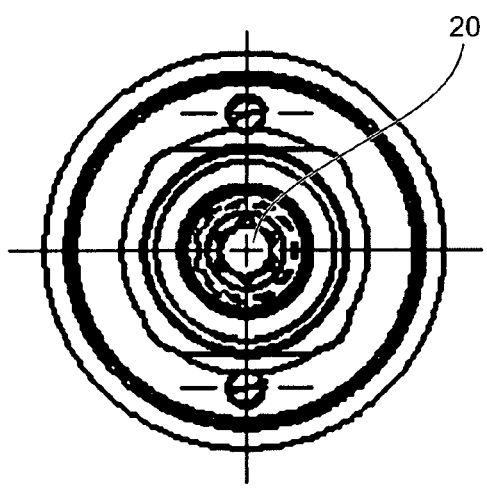
FIG. 11 shows an end view of the shank according to arrow XI-XI in FIG. 10.
Figure 12:
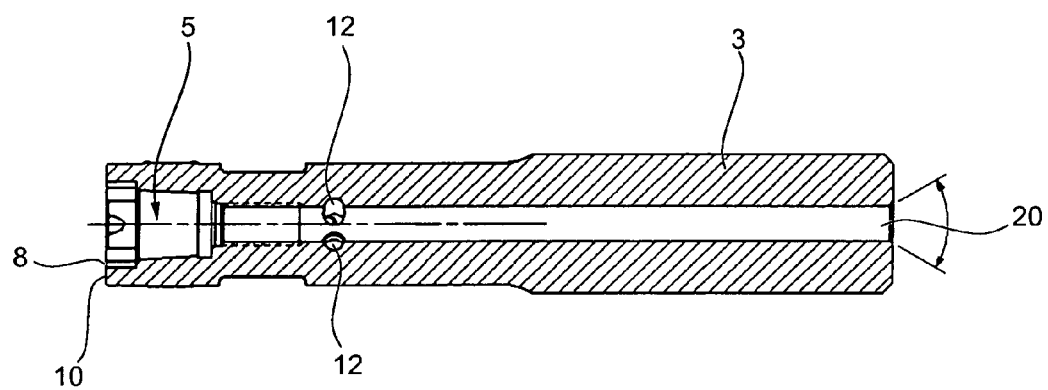
FIG. 12 shows the section XII-XII in FIG. 10.

A coolant passage 20, which is central to begin with, passes through the shank 2 in the center longitudinal direction. The coolant passage 20 branches into two sub-passages 12 in the region of the receptacle 5—a factor which can be easily seen in FIG. 9. The sub-passages 12 flank the receptacle 5 and open into the orifices 11 in the region of the flat contact surface 10. The coolant therefore flows to begin with through the central coolant passage 20 and splits up in turn into two partial flows, which flow through the respective sub-passages 12 and discharge into the orifices 11 at the flat contact surface 10.

Figure 3:
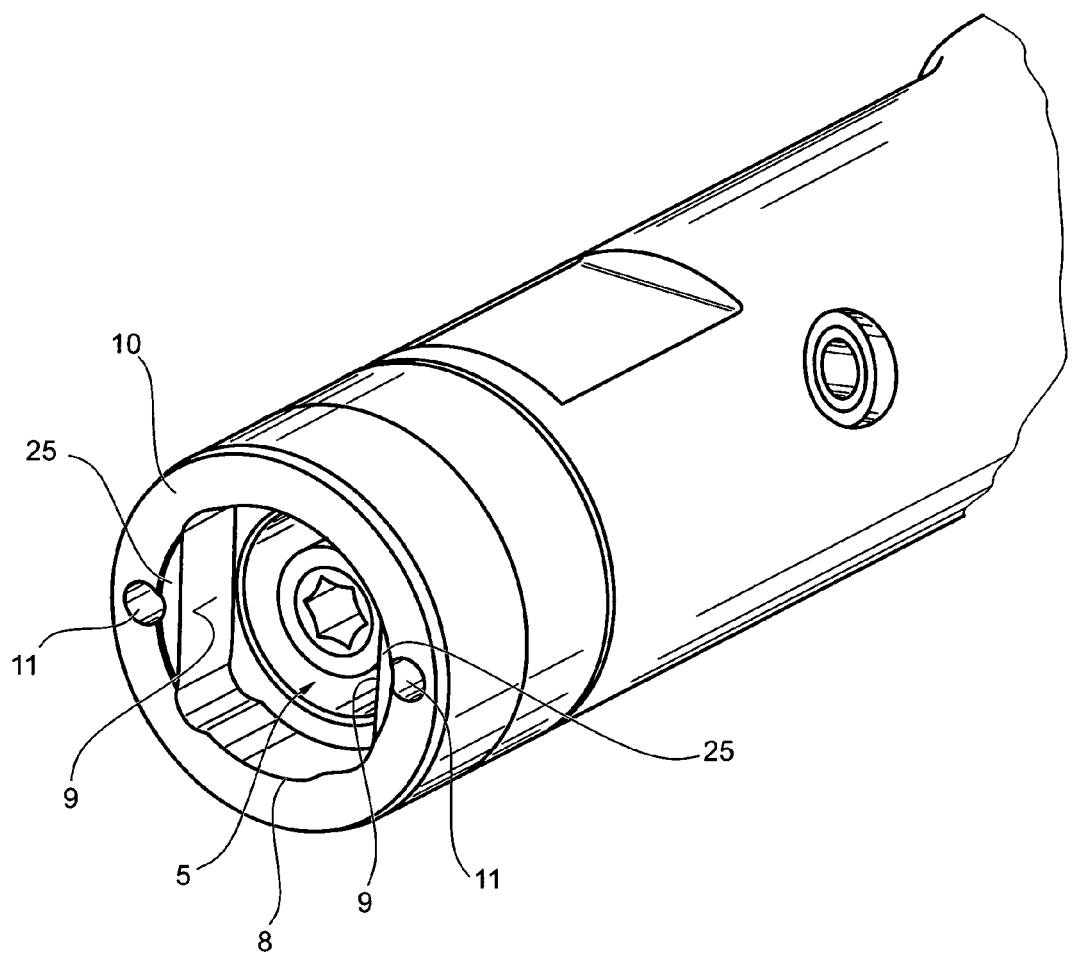
FIG. 3 shows a plan view of the opening edge of the receptacle in the shank.

The crescent-shaped recesses 25 in the opening edge 8 in the region of the orifices 11 can be seen in the illustration in FIG. 3. These crescent-shaped recesses 25 prevent the flat contact surface 10 from resting on that region of the flat collar 16 which is adjacent to the flat face 18 and which cannot be reworked. This region of the flat collar 16 adjacent to the flat face 18 has, in FIG. 5, a funnel-like widening 26, such as a cut-out portion. The funnel-like widening 26, in particular in interplay with the recesses 25, additionally brings about quicker filling of the distribution groove 15 with the coolant.

Figure 7:
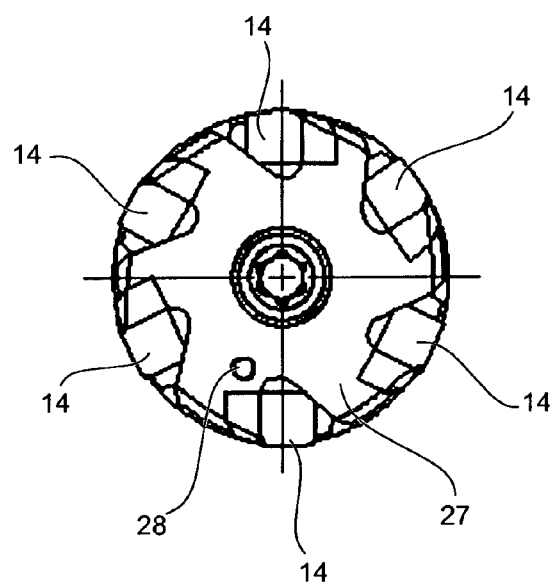
FIG. 7 shows a plan view of the end face of the cutting head according to arrow VII in FIG. 6.

The cutting-head end wall 27 remote from the cutting-head rear wall 7 can be seen in FIG. 7. The cutting-head end wall 27 in FIG. 7 has a coolant outlet 28. In the embodiment according to FIG. 7, the coolant is therefore not delivered to the individual blades 14 but rather discharges via the coolant outlet 28. This embodiment is suitable for machining blind bores. The coolant therefore first of all sprays against the bottom of the blind bore and is reflected from there toward the blades 14.

Figure 13:
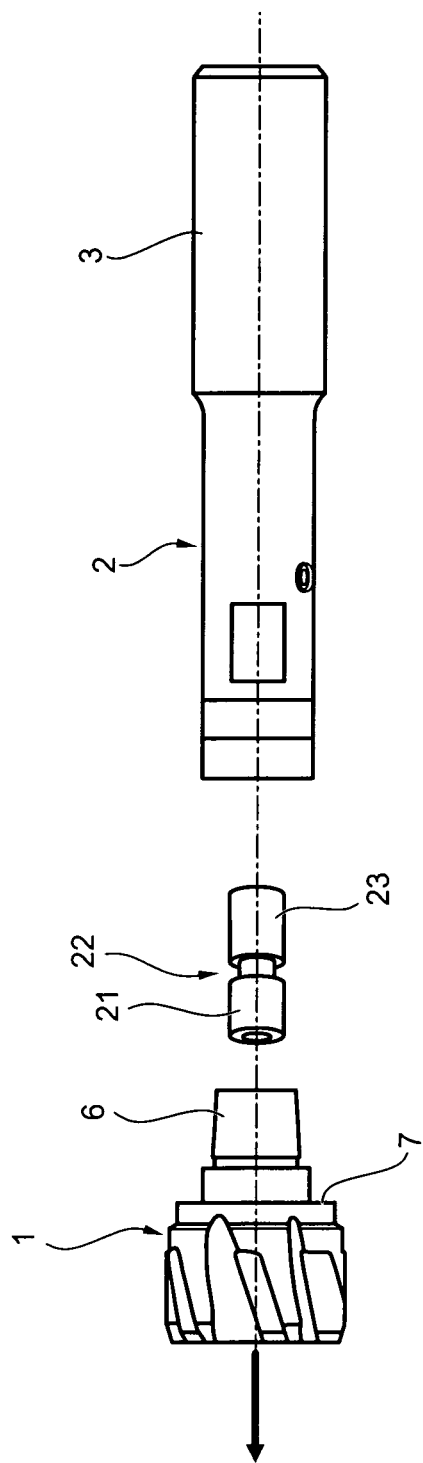
FIG. 13 shows an exploded drawing of the embodiment of the tool with screwing insert as coupling.

FIG. 13 again shows the shank 2 and the cutting head 1. The cutting head 1 again has a coupling pin 6 on the cutting-head rear wall 7 thereof. The coupling pin 6 in FIG. 13, however, is recessed in a hollow-cylindrical manner and has an internal thread designed as a right-hand thread. The fine thread 21 of the screwing insert 22 can be screwed into this internal thread of the coupling pin 6. The screwing insert 22 has a coarse thread 23 on the end thereof remote from the fine thread 21. By means of the coarse thread 23, which is likewise designed as a right-hand thread, the screwing insert 22 can be screwed into an internal thread in the receptacle 5 of the shank 2.

The invention claimed is:

1. A cutting tool for a machine tool, comprising:
    a cutting head having a number of blades, a cutting-head rear wall and a flat collar on the cutting-head rear wall;
    a shank;
    a coupling which detachably fixes the cutting head to the shank, said coupling consisting of a coupling pin on the cutting-head rear wall and a receptacle in the shank, said receptacle being complementary to the coupling pin and accommodating the coupling pin when the coupling is closed; and
    a central coolant passage in the shank, said coolant passage branching into two sub-passages in the region of the receptacle, wherein the two sub-passages flank the receptacle in a wall thereof,
    wherein:
        the two sub-passages open into a flat contact surface surrounding an opening edge of the receptacle in a ring-like manner and each sub passage opens into the flat contact surface via an orifice,
        the flat collar having an annular distribution groove formed on the cutting-head rear wall, wherein the flat collar defines a cut-out portion in communication with the distribution groove such that the cut-out portion is configured to widen a region of the distribution groove, the cut-out portion being located opposite one of the orifices when the coupling is closed, and
        at least one coolant bore connects the distribution groove to the number of blades on the cutting head.

2. The tool as claimed in claim 1, wherein the number of blades comprise a plurality of blades distributed over the periphery of the cutting head and wherein a number of coolant bores, corresponding to the number of blades are provided as connecting lines between the distribution groove and the respective blades.

3. The tool as claimed in claim 1, wherein the cutting head comprises one or more coolant bores which open out on a cutting-head end wall remote from a cutting-head rear wall.

4. The tool as claimed in claim 1, wherein a crescent-shaped recess is provided at the opening edge of the receptacle in the region of each of the orifices of the sub-passages.

5. The tool as claimed in claim 1, wherein the shank comprises at least one bearing surface arranged at the opening edge of the receptacle and extending into the receptacle, and wherein the head comprises at least one mating bearing surface on an outer casing of the coupling pin, said mating bearing surface resting on the bearing surface when the coupling is closed.

6. The tool as claimed in claim 5, wherein the bearing surface and the mating bearing surface are designed as flat faces and/or in that two bearing surfaces and two mating bearing surfaces are in each case arranged in pairs and opposite one another.

7. The tool as claimed in claim 5, wherein said flat collar surrounds the coupling pin like a flange, and wherein the coupling pin comprises a casing ring that adjoins the flat collar, enlarges the diameter of the coupling pin, and has the mating bearing surface.

8. The tool as claimed in claim 1, further comprising a screwing insert having two external threads with the same direction of hand and at the same time different pitches, wherein one external thread is received in a hollow-cylindrical recess in the coupling pin and the other external thread is received in an internal thread in the receptacle.

* * * * *